United States Patent [19]
Robinson et al.

[11] 4,373,173
[45] Feb. 8, 1983

[54] MULTI-ELEMENT HEAD ASSEMBLY

[75] Inventors: Neil L. Robinson; Ralph D. Silkensen, both of Tucson, Ariz.

[73] Assignee: International Business Machines Corporation, Armonk, N.Y.

[21] Appl. No.: 245,562

[22] Filed: Mar. 19, 1981

[51] Int. Cl.$^3$ .......................... G11B 5/20; G11B 5/22; G11B 5/42
[52] U.S. Cl. .................................. 360/121; 360/123; 360/125
[58] Field of Search ............... 360/121, 125, 123, 122, 360/126–127, 119

[56] References Cited
U.S. PATENT DOCUMENTS

| | | | |
|---|---|---|---|
| 3,925,884 | 12/1975 | Case | 360/123 |
| 3,986,210 | 10/1976 | Sugaya et al. | 360/121 |
| 4,217,613 | 8/1980 | Schwartz | 360/125 |

*Primary Examiner*—Alfred H. Eddleman
*Attorney, Agent, or Firm*—Nathan N. Kallman; Henry E. Otto, Jr.

[57] ABSTRACT

A batch fabricated multi-element head is made from interlocking ferrite parts to form a low contoured surface for interfacing with a magnetic medium, such as a flexible disk. On another surface, a multi-turn conductive coil is formed by thin film process and cooperates with a flux path bar to define the magnetic flux field.

6 Claims, 6 Drawing Figures

MULTI-ELEMENT HEAD ASSEMBLY

DESCRIPTION

1. Technical Field

This invention relates to a multi-element magnetic head assembly and in particular to a high track density ferrite magnetic head.

An object of this invention is to provide a simplified, inexpensive method and means for making a multi-element ferrite head.

Another object of this invention is to provide a high track density multi-element head having precisely aligned transducing gaps.

Another object is to provide a multi-element ferrite head having a relatively low contoured gap surface.

2. Background Art

One type of multi-element or multi-track magnetic head is made from a magnetic ferrite structure having a series of transducing gaps. A multi-element head is generally used with magnetic tape machines in which one surface of the medium is employed for data recording of a multiplicity of tracks simultaneously. Some magnetic disk files, such as disclosed in U.S. Pat. No. 3,822,473, have employed multi-track magnetic heads. These multi-element heads generally have a vertical height of relatively large dimension between adjacent rigid disk surfaces, which require relatively large spacings between the disks. Also, such multi-element heads employ wound electrical coils associated with each element, as disclosed in U.S. Pat. 3,579,214. Such wound coils occupy a significant amount of space. In those machines that employ very closely spaced multiple recording media, such as flexible or floppy disk files in which adjacent flexible disks are closely adjacent, space considerations are significant. In addition to the consideration of space requirements between disks, the density or packing of the data tracks on the surface of each disk is a major concern.

BRIEF DESCRIPTION OF THE DRAWINGS

The invention will be described in detail with reference to the drawings in which.

Similar numerals refer to similar elements throughout the drawing.

The scales and proportions of the Figures are not necessarily consistent and are varied for convenience and to aid in the explanation of the invention.

DESCRIPTION OF THE PREFERRED EMBODIMENT

Figure 1:
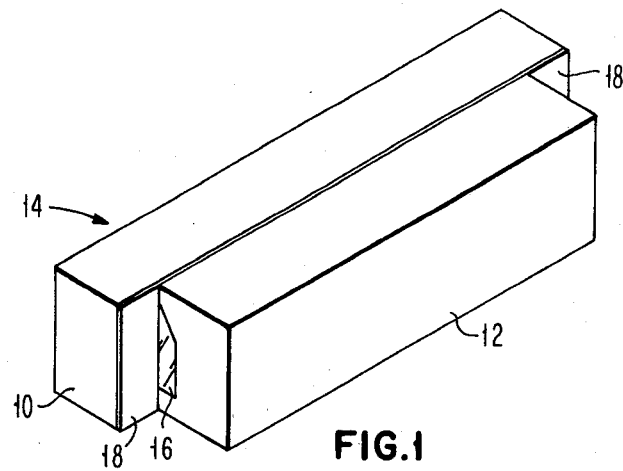
FIG. 1 is an isometric view of a machined and glassed ferrite part to be used in the assembly of the magnetic head of this invention.
Figure 2:
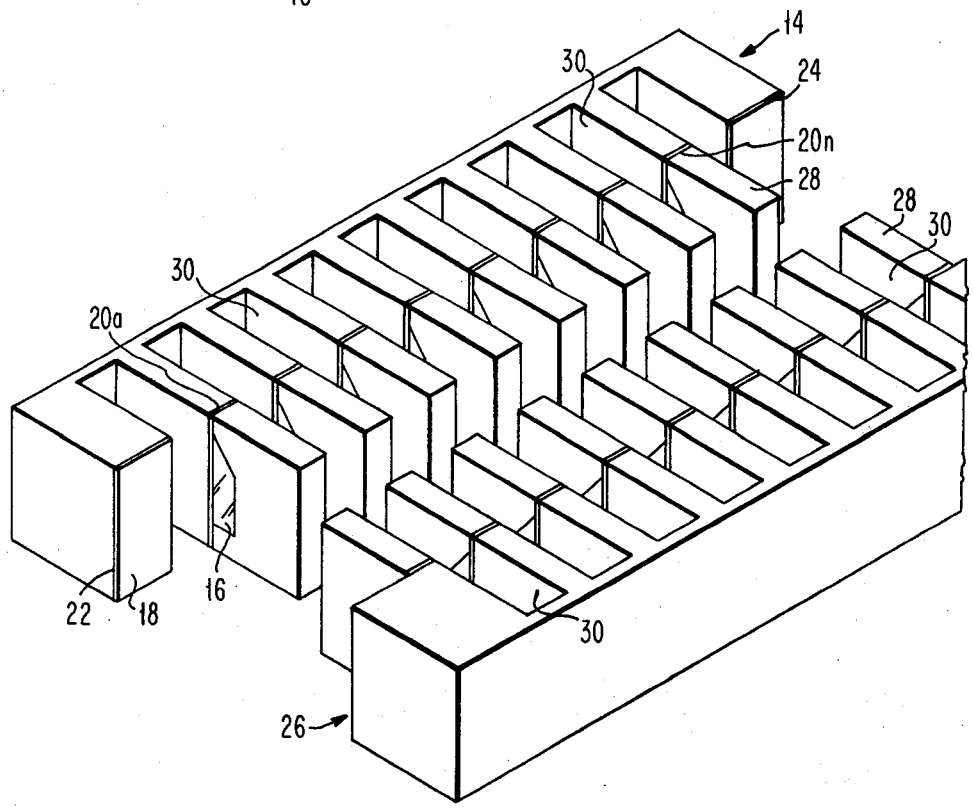
FIG. 2 is an isometric illustration, partly cut away, of the machined parts to be interlocked during the processing and assembly of the magnetic head of this invention (two assemblies as described in FIG. 1 make up the composition of FIG. 2)
Figure 3:
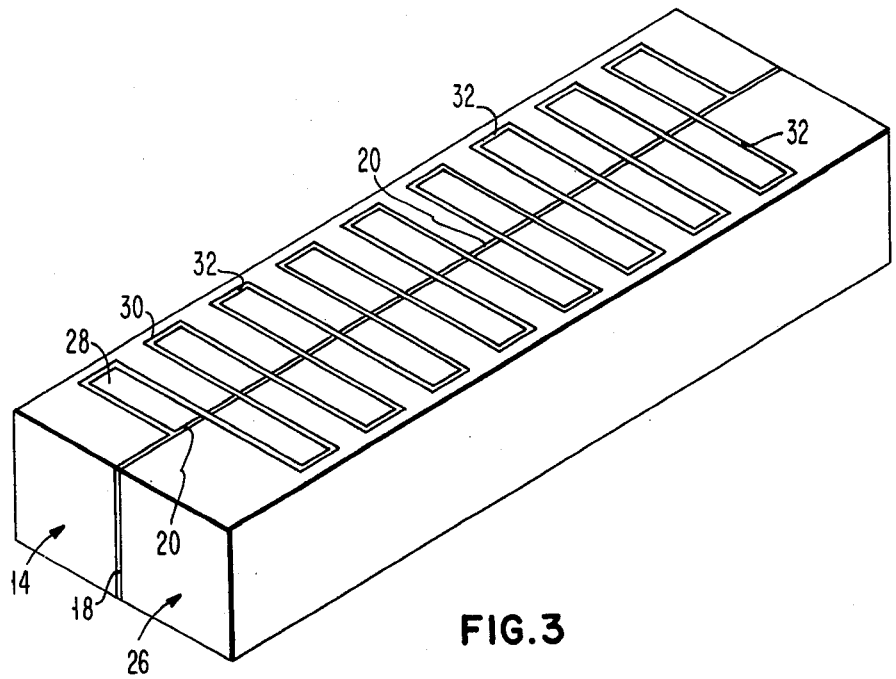
FIG. 3 is an isometric view of the interlocked magnetic head parts.

With reference to FIGS. 1-3, a rectangular ferrite block 10 is joined to a shaped ferrite section 12 by means of a high temperature glass in a fluid state to form a sandwich assembly 14. The ferrite section 12 includes a channel 16 that determines the back gap of the multi-element magnetic head that is being formed. The glass bonding layer or shim 18 serves to define transducing gaps 20a-n, respectively, for each of a multiplicity of head elements of the finished magnetic head assembly. The glass shim 18 also is disposed on reliefs or reference surfaces 22,24 at the ends of the ferrite block 10 to enable proper engagement of the sandwich assembly 14 with a second ferrite sandwich assembly 26.

To mate the two sandwich assemblies 14 and 26, uniformly spaced rectangular slots 30 are machined and cut through each of the ferrite sections and glass bonds into the ferrite blocks of the sandwich assemblies, thereby forming alternating fingers or projections 28. The projections 28 are dimensioned to provide a close fit with the opposing slots 30, with the allowance of relatively small spacing between the projections and slots to enable insertion of a low temperature bonding glass 32 in a fluid state. The sandwich assemblies are aligned and positioned in engaging relation so that the relief surfaces 22 and 24 abut the opposing relief surfaces of the sandwich assembly 26. When the opposing sandwich assemblies 14 and 26 are joined, as depicted in FIG. 3, the transducing gaps 20 of each head element are aligned in seriatim along the central longitudinal axis of the joined head assembly.

Figure 4:
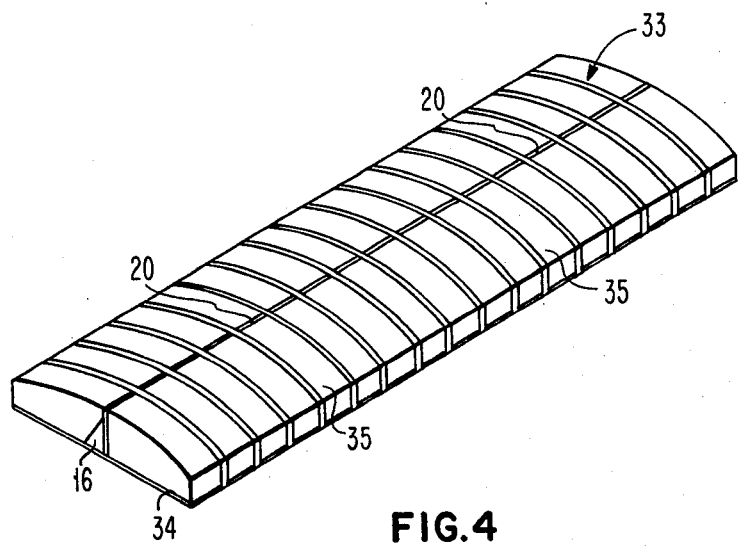
FIG. 4 is an isometric top view of the final magnetic head assembly of this invention.

In accordance with this invention, the top and bottom surfaces of the joined sandwich assemblies are lapped to achieve a low contoured head assembly, as depicted in FIG. 4. The top surface 33 is lapped and polished to produce a low contoured arcuate configuration, in which the vertical height from the bottom surface 34 to the contoured face is substantially less than the width or length of said head assembly. The bottom surface 34 of the head assembly is lapped and polished to a high degree of flatness so as to accept thin film layers that will form the conductive coil and a flux path for the magnetic head circuitry. The segments 35 of the head structure shown in FIG. 4 represent discrete head elements, including discrete transducing gaps 20.

Figure 5:
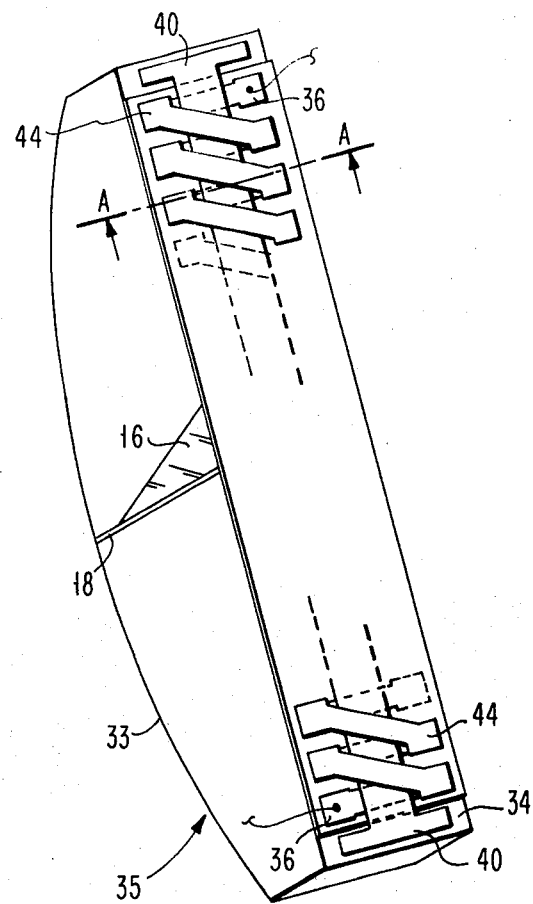
FIG. 5 is a bottom view of a single track of the joined magnetic head assembly, depicting the thin film coil structures associated with one element of the multiple elements and tracks of the magnetic head assembly, wherein one such coil would be present on each track.
Figure 6:
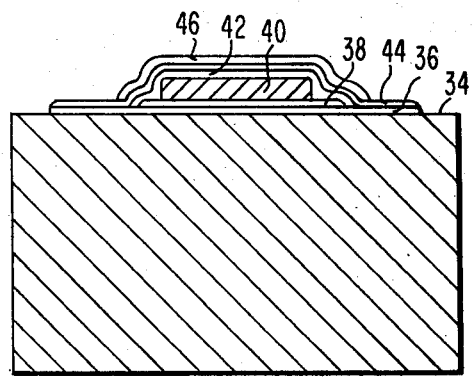
FIG. 6 is a sectional view A—A, taken through FIG. 5.

To complete the multi-element head assembly, a patterned conductive thin film layer 36 which may be gold or copper for example, is vacuum deposited on the bottom surface 34 of the head assembly (see FIG. 6). An insulating layer 38 of $Al_2O_3$ is sputter-deposited on the conductive layer 36, leaving the end portions of the layer 36 exposed. A thick bar type layer 40 of Permalloy, of about 3 mil thickness, is then sputter-deposited on the insulator 38 to provide a flux path for the magnetic circuit of the head. The ends of the flux path bar 40 are in intimate contact with the ferrite surface of the head assembly, as shown in FIG. 5.

Thereafter, another insulating layer 42 of $Al_2O_3$ is deposited on the Permalloy flux path bar, still leaving the ends of the conductive layer 36 exposed. A second patterned conductive thin film layer 44 is then formed by vacuum deposition, by way of example, so as to connect with the exposed ends of the first conductive layer 36, thereby closing a conductive path which is disposed around the flux bar 40. Finally, an insulating passivation layer 46, which may be Al$_2$O$_3$, is sputter-deposited to complete an assembly of the multi-turn thin film coil and flux path bar for each head element.

It should be understood that the invention is not limited to the specific materials, processes or dimension recited above. For example, the conductive elements of the coil may be made from aluminum or other conductive materials and may be electroplated, patterned by etching, lift-off, or plate-through instead of by vacuum deposition. Also, the insulating layers may be made of polyimide or photoresist, and by photolithography and baking. In addition, instead of using thick Permalloy for the flux path bar, laminated Permalloy and silicon dioxide layers may be used and may be patterned by reactive ion etching. Other changes and modifications may be made within the scope of the invention.

What is claimed is:

1. A multi-element magnetic head assembly comprising:
  joined ferrite sandwich assemblies defining a multiplicity of separate transducing elements of uniform size and spacing, said sandwich assemblies comprising projections and cooperating slots for forming an interlocked head assembly;
  thin film means forming multi-turn conductive coils for coupling respectively to said separate transducing elements, said thin film means being disposed on a bottom surface of said head assembly; and
  an insulator material disposed over said conductive coils.

2. A multi-element magnetic head assembly as in claim 1, wherein said transducing elements each have a transducing gap, said gaps being colinearly aligned substantially along the center of the face of said head assembly.

3. A multi-element magnetic head assembly as in claim 2, wherein said sandwich assemblies have relief sections at each end for abutment with each other when said sandwich assemblies are joined so that said transducing gaps are properly aligned in series.

4. A multi-element magnetic head assembly as in claim 1, including a flux bar disposed within said thin film means for forming a magnetic flux path.

5. A multi-element magnetic head assembly as in claim 4, wherein said flux bar is made of Permalloy, or other highly permeable material.

6. A multi-element magnetic head assembly as in claim 1, wherein said head assembly is arcuately contoured and its maximum height is substantially less than its width or length.

* * * * *